United States Patent
Yasunaga (10) Patent No.: US 9,571,738 B2
(45) Date of Patent: Feb. 14, 2017

(54) IMAGE PROCESSING APPARATUS

(71) Applicant: Toshiba Tec Kabushiki Kaisha, Tokyo (JP)

(72) Inventor: Masaaki Yasunaga, Sunto Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/748,077

(22) Filed: Jun. 23, 2015

(65) Prior Publication Data

US 2016/0381296 A1   Dec. 29, 2016

(51) Int. Cl.
*H04N 5/225* (2006.01)
*H04N 5/232* (2006.01)
*H04N 5/372* (2011.01)

(52) U.S. Cl.
CPC .......... *H04N 5/23293* (2013.01); *H04N 5/372* (2013.01)

(58) Field of Classification Search
CPC .............. H04N 1/2125; H04N 5/23216; H04N 1/00408; H04N 1/00411; H04N 1/00413; H04N 5/3415; H04N 2013/0088; G06F 3/005; G06F 3/048; G08B 13/19678; G08B 13/1968; G08B 13/19682; G03B 37/02; G03B 37/04

See application file for complete search history.

(56) References Cited

U.S. PATENT DOCUMENTS

| | | | | |
|---|---|---|---|---|
| 9,280,223 B2 * | 3/2016 | Toida | ...................... | G06F 3/041 |
| 2005/0185070 A1 | 8/2005 | Cheatle | | |
| 2008/0239132 A1 * | 10/2008 | Kohama | ................ | G06F 3/0481 |
| | | | | 348/333.01 |
| 2010/0208107 A1 * | 8/2010 | Nonaka | .................. | G06F 1/1626 |
| | | | | 348/240.99 |
| 2012/0294549 A1 | 11/2012 | Doepke | | |
| 2013/0176384 A1 * | 7/2013 | Jones | .................. | H04N 5/23238 |
| | | | | 348/36 |
| 2014/0118483 A1 * | 5/2014 | Rapoport | ............ | H04N 5/23258 |
| | | | | 348/36 |
| 2014/0164938 A1 * | 6/2014 | Petterson | ............... | G06F 3/0482 |
| | | | | 715/739 |
| 2016/0050173 A1 * | 2/2016 | Nakamura | ............ | G06Q 10/107 |
| | | | | 709/206 |
| 2016/0073034 A1 * | 3/2016 | Mukherjee | .......... | H04N 5/23293 |
| | | | | 348/333.11 |

FOREIGN PATENT DOCUMENTS

WO   WO2014085948 A1 *   6/2014

* cited by examiner

*Primary Examiner* — Twyler Haskins
*Assistant Examiner* — Dwight C Tejano
(74) *Attorney, Agent, or Firm* — Patterson & Sheridan, LLP (57) ABSTRACT

According to one embodiment, an image processing apparatus includes a display unit, an image acquiring unit, a reduction processor, a combining unit, and a display processor. The display unit displays images. The image acquiring unit acquires a plurality of photographed images, with photography ranges thereof being gradually changed. The reduction processor reduces the photographed images acquired by the image acquiring unit. The combining unit combines the photographed images reduced by the reduction processor to generate a preview image. The display processor displays the preview image on part of the display unit that displays the photographed images acquired by the image acquiring unit.

4 Claims, 11 Drawing Sheets

IMAGE PROCESSING APPARATUS

FIELD

Embodiments described herein relate generally to an image processing apparatus.

BACKGROUND

Some image processing apparatuses combine a plurality of images to generate a composite image. Such image processing apparatuses require images within a predetermined range, to generate a composite image (for example, a composite image obtained by photographing a predetermined object) including the predetermined range. The related art has a problem that a generated composite image should be visually inspected by human to check whether the image processing apparatus properly acquired the image.

DETAILED DESCRIPTION

In general, according to one embodiment, an image processing apparatus includes a display unit, an image acquiring unit, a reduction processor, a combining unit, and a display processor. The display unit displays images. The image acquiring unit acquires a plurality of photographed images, with photography ranges thereof being gradually changed. The reduction processor reduces the photographed images acquired by the image acquiring unit. The combining unit combines the photographed images reduced by the reduction processor to generate a preview image. The display processor displays the preview image on part of the display unit that displays the photographed images acquired by the image acquiring unit.

Embodiments will be explained hereinafter with reference to drawings.

First Embodiment

First, an image processing apparatus according to a first embodiment will be explained hereinafter.

Figure 1:
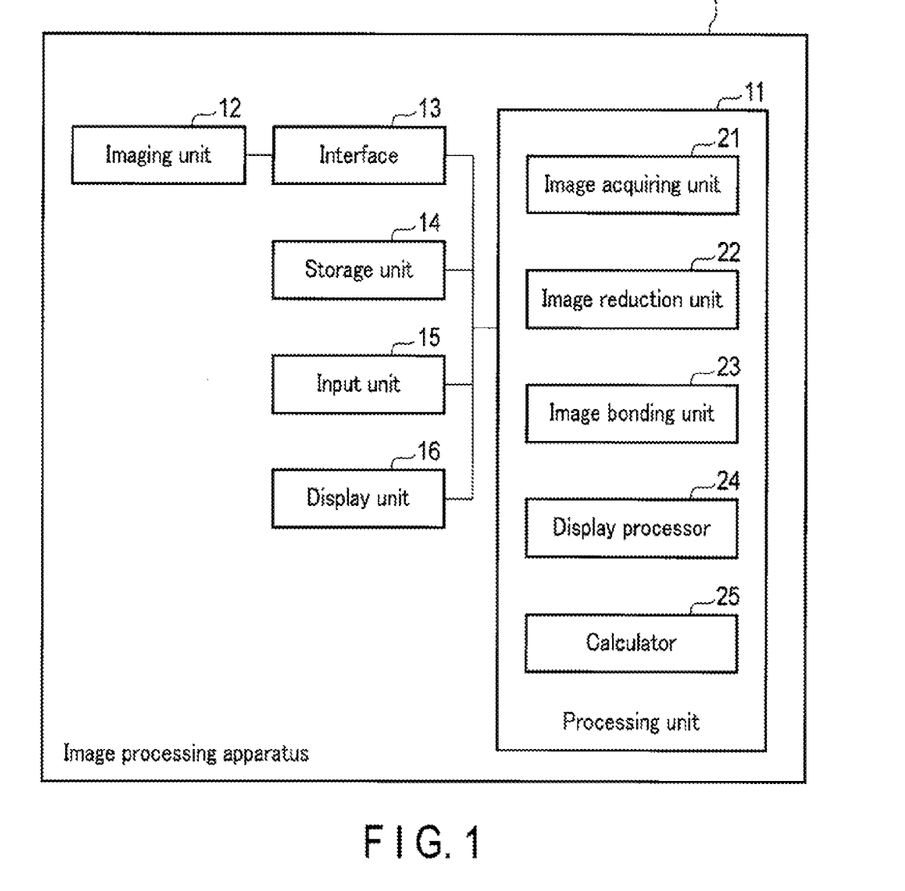
FIG. 1 is a schematic diagram of a configuration example of an image processing apparatus according to a first embodiment.

FIG. 1 is a block diagram of a configuration example of an image processing apparatus 1.

The image processing apparatus 1 acquires a plurality of images, to generate a composite image obtained by combining the images. For example, the image processing apparatus 1 is moved by human. The image processing apparatus 1 successively acquires images while being moved, to acquire a plurality of images, with photography ranges thereof being gradually changed. The image processing apparatus 1 connects the acquired images to generate a composite image.

The image processing apparatus 1 may be, for example, a smartphone, a tablet personal computer, or a notebook computer.

As illustrated in FIG. 1, the image processing apparatus 1 includes a processing unit 11, an imaging unit 12, an interface 13, a storage unit 14, an input unit 15, and a display unit 16.

The processing unit 11 has a function of controlling operations of the whole image processing apparatus 1. The processing unit 11 may include, for example, a processor (CPU), an internal memory, a ROM, a RAM, and an interface of various types. The processor of the processing unit 11 achieves the function of the processing unit 11 by executing a program stored in advance in the internal memory, ROM, RAM, or storage unit 14.

A hardware circuit may achieve part of various functions achieved by execution of a program by the processing unit 11. In such a case, the processing unit 11 controls the function executed by the hardware circuit.

The ROM is a nonvolatile memory that stores a control program or control data in advance. The control program and control data stored in the ROM are incorporated in advance according to the specifications of the image processing apparatus 1. For example, the ROM stores a program (such as a BIOS) that controls the circuit board of the image processing apparatus 1.

The RAM is a volatile memory. The RAM temporarily stores data that is being processed by the processing unit 11. The RAM stores various application programs, based on instructions from the processing unit 11. The RAM may also store data necessary for execution of the application programs, and execution results of the application programs.

The imaging unit 12 photographs images. The imaging unit 12 photographs images, in accordance with a signal from the processing unit 11. The imaging unit 12 transmits the photographed images to the processing unit 11. For example, the imaging unit 12 is capable of photographing images at predetermined intervals. For example, the imaging unit 12 may photograph moving images at 30 fps (or 60 fps).

The imaging unit 12 is, for example, a CCD camera. The imaging unit 12 may be a device independent of the image processing apparatus 1. For example, the imaging unit 12 may transmit images to the image processing apparatus 1 by radio.

The interface 13 is an interface that communicates with the imaging unit 12. For example, the interface 13 transmits a signal to the imaging unit 12, to cause the imaging unit 12 to photograph an image in response to a signal from the processing unit 11. The interface 13 also transmits the image photographed by the imaging unit 12 to the processing unit 11. For example, the interface 13 may be an interface that supports USB connection.

The storage unit 14 is a nonvolatile memory. For example, the storage unit 14 is a memory to which data can be written and rewritten. The storage unit 14 is formed of, for example, a hard disk, an SSD, or a flash memory. The storage unit 14 may store a control program, applications, and various data according to the use of the image processing apparatus 1.

The input unit 15 receives various operation instructions that are input by the operator of the image processing unit 1. The input unit 15 transmits data of the operation instructions input by the operator to the processing unit 11. The input unit 15 is, for example, a keyboard, a numeric keypad, or a touch panel. In this example, the input unit 15 is a touch panel.

The display unit 16 is a display device that displays various pieces of information (such as images) under the control of the processing unit 11. The display unit 16 is, for example, a liquid crystal display monitor. In this example, the display unit 16 is formed as a unitary member with the input unit 15.

The following is explanation of functions achieved by the processing unit 11.

The processing unit 11 achieves an image acquiring unit 21, an image reduction unit 22, an image bonding unit 23, a display processor 24, and a calculator 25.

The image acquiring unit 21 acquires a plurality of photographed images, with photography ranges thereof being gradually changed. For example, the image acquiring unit 21 transmits a signal to cause the imaging unit 12 to photograph images through the interface 13. The image acquiring unit 21 acquires images photographed by the imaging unit 12 through the interface 13. The image acquiring unit 21 may acquire photographed images from an external device through a communication interface or the like. For example, the imaging acquiring unit 21 acquires a plurality of photographed images obtained by photographing a predetermined region from gradually shifted positions. For example, the image acquiring unit 21 acquires a plurality of photographed images that are shifted in a one-dimensional direction, two dimensional direction, or three-dimensional direction.

The image reduction unit 22 (reduction processor) reduces the photographed images. The image reduction unit 22 reduces the photographed image whenever the image acquiring unit acquires a photographed image. For example, the image reduction unit 22 reduces the photographed image by the nearest neighbor method or the bicubic method. The method for reducing the photographed image by the image reduction unit 22 is not limited to any specific method.

The image bonding unit 23 connects the reduced photograph images to generate a preview image. The image bonding unit 23 additionally connects the photographed image to the preview image, whenever the image reduction of the preview display region to fit the preview image.

The display processor 24 may display the photographed image being photographed by the imaging unit 12 on the display unit 16. The display processor 24 may set a preview display region in part of the display unit 16 that displays the photographed image, and display the preview image in the preview display region.

The display processor 24 may display a photographed image frame to show a photographed image being photographed by the imaging unit 12 on the preview image.

The calculator 25 executes various calculations. For example, the calculator 25 calculates feature quantities of portions of the photographed image to extract the feature point of the photographed image. The calculator 25 may also execute calculation to reduce the photographed image.

The following is explanation of the operation example of the image processing apparatus 1.

Figure 2:
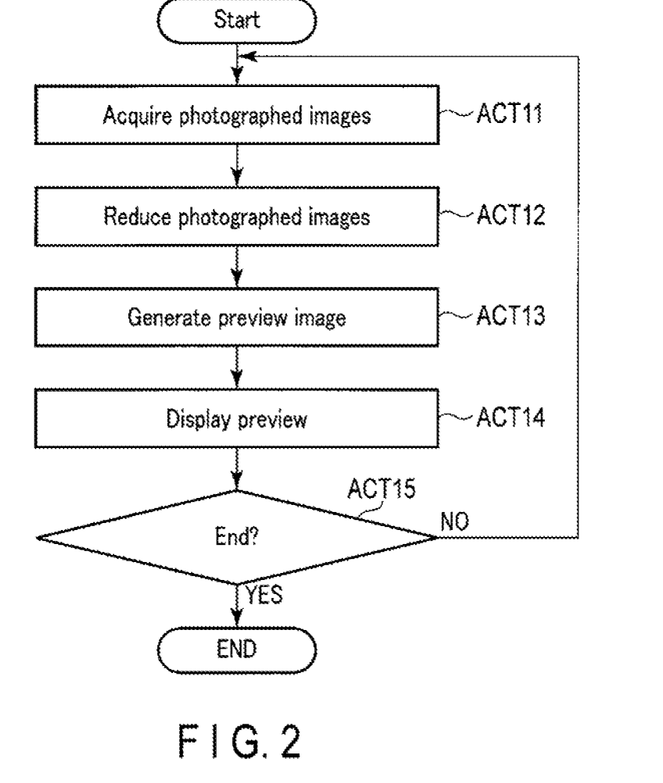
FIG. 2 is a flowchart of an operation example of the image processing apparatus according to the first embodiment.

FIG. 2 is a flowchart for explaining the operation example of the image processing apparatus 1.

First, the processing unit 11 of the image processing apparatus 1 acquires photographed images (ACT 11). When the processing unit 11 acquires photographed images, the processing unit 11 reduces the acquired photographed images (ACT 12).

When the processing unit 11 reduces the photographed images, the processing unit 11 bonds the reduced photographed images together to generate a preview image (ACT 13). When the processing unit 11 generates a preview image, the processing unit 11 displays the preview image on the display unit 16 (ACT 14).

When the preview image is displayed, the processing unit 11 determines whether acquisition of photographed images is ended (ACT 15). For example, the processing unit 11 determines whether the processing unit 11 received an operation to end acquisition of photographed images through the input unit 15.

When the processing unit 11 determines that acquisition of photographed images is not ended (ACT15, NO), the processing unit 11 returns to ACT11.

When the processing unit 11 determines that acquisition of photographed images is ended (ACT15, YES), the processing unit 11 ends the operation.

The following is explanation of an example of display on the display unit 16 of the image processing apparatus 1.

Figure 3:
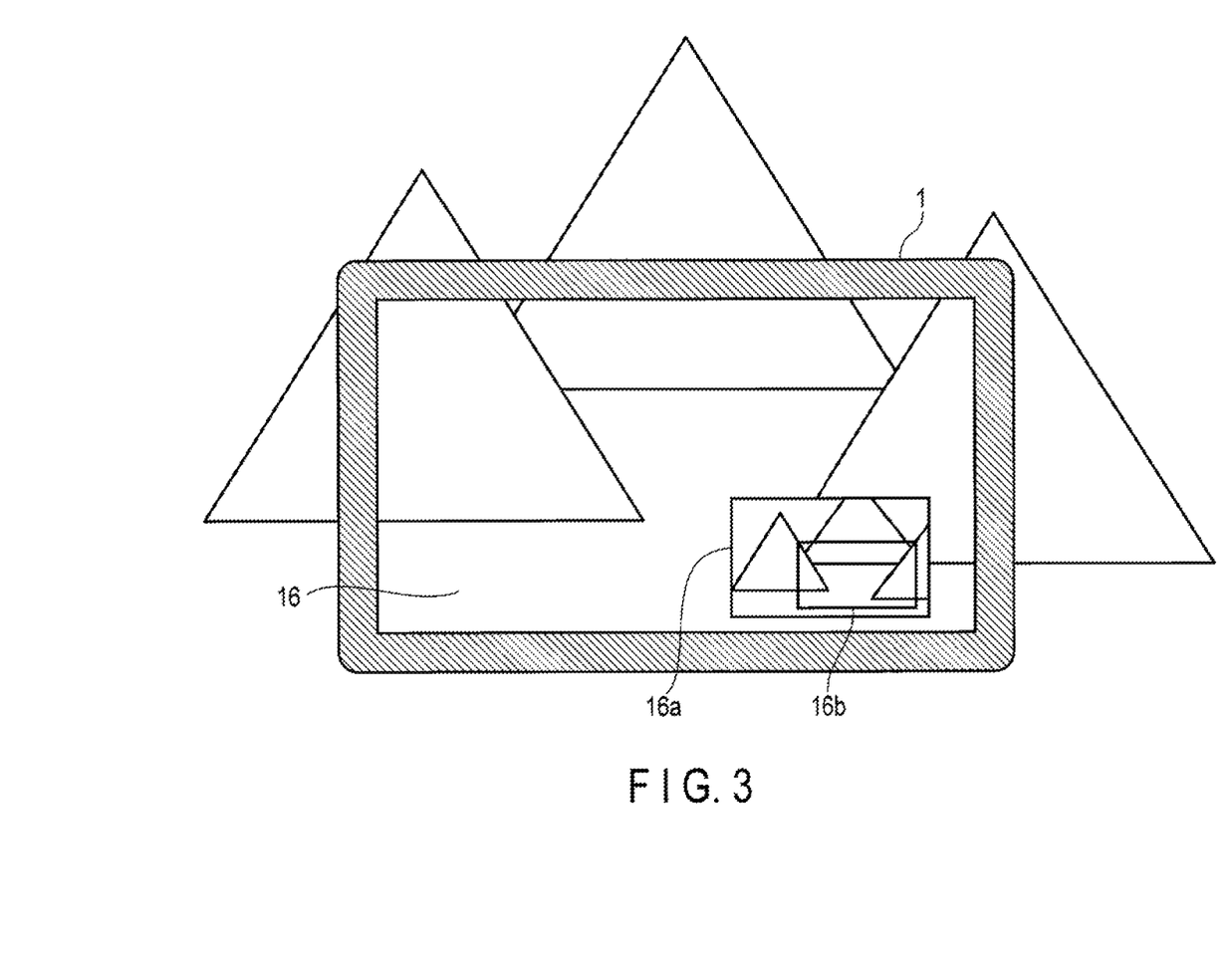
FIG. 3 is a diagram illustrating a display example of the image processing apparatus according to the first embodiment.

FIG. 3 is a diagram illustrating an example of display on the display unit 16.

In the example illustrated in FIG. 3, suppose that the image processing unit 1 repeatedly executes ACT 11 to ACT 15.

As illustrated in FIG. 3, the processing unit 11 displays a photographed image being photographed by the imaging unit 12 on the whole display unit 16. The processing unit 11 also sets a preview display region 16*a* on part of the display unit 16. The processing unit 11 displays a preview image generated in ACT 13 in the preview display region 16*a*. The processing unit 11 also sets a photograph image frame 16*b* that shows a photographed image being photographed by the imaging unit 12 in the preview display region 16*a*.

The processing unit 11 may connect a plurality of photographed images without reducing the photographed images. The processing unit 11 may reduce the connected image to generate a preview image.

The image processing apparatus with the structure as described above is capable of displaying a preview image obtained by connecting photographed images on the display unit. With this structure, the image processing apparatus enables the operator to check in real time whether any omission in imaging exists. Consequently, the image processing apparatus enables the operator to easily check the image acquisition state.

Second Embodiment

Next, a second embodiment will be explained hereinafter.

The image processing apparatus 1 according to the second embodiment is different from the image processing apparatus 1 according to the first embodiment in the point of determining whether any imaging omission exists. For this reason, detailed explanation of the other points will be omitted with the same reference numerals assigned.

Figure 4:
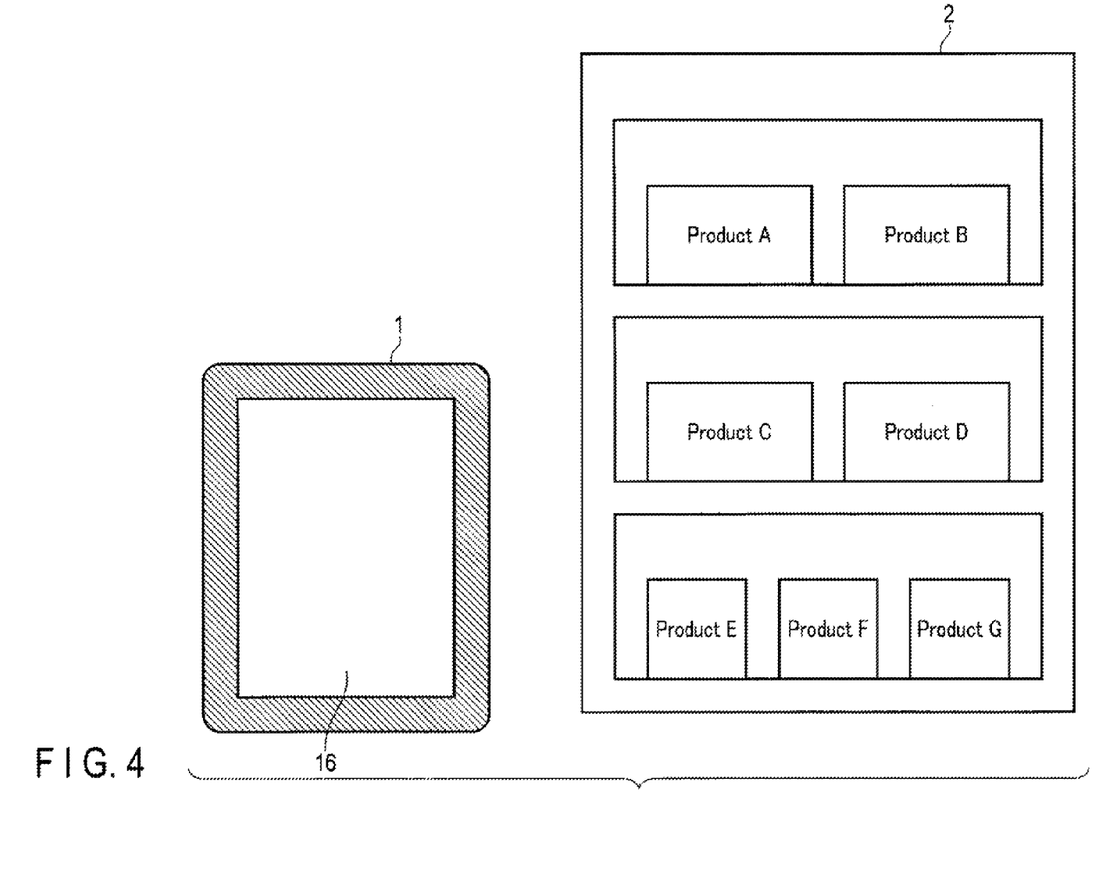
FIG. 4 is a diagram illustrating an example of an imaging object according to a second embodiment.

FIG. 4 is a diagram illustrating an example of the image processing apparatus 1 and a product shelf 2 according to the second embodiment.

The product shelf 2 is placed in a sales shop to sell products or the like. Products are arranged on the product shelf 2.

For example, the image processing apparatus 1 generates a composite image photographing the product shelf 2. Specifically, the image processing apparatus 1 acquires a plurality of images obtained by photographing portions of the product shelf 2, to generate a composite image by combining the images.

The image processing apparatus 1 determines whether the product shelf 2 was photographed without omission. The object for which the image processing apparatus 1 determines whether the object was photographed without omission is not limited to any specific structure.

The following is explanation of a configuration example of the image processing apparatus 1.

Figure 5:
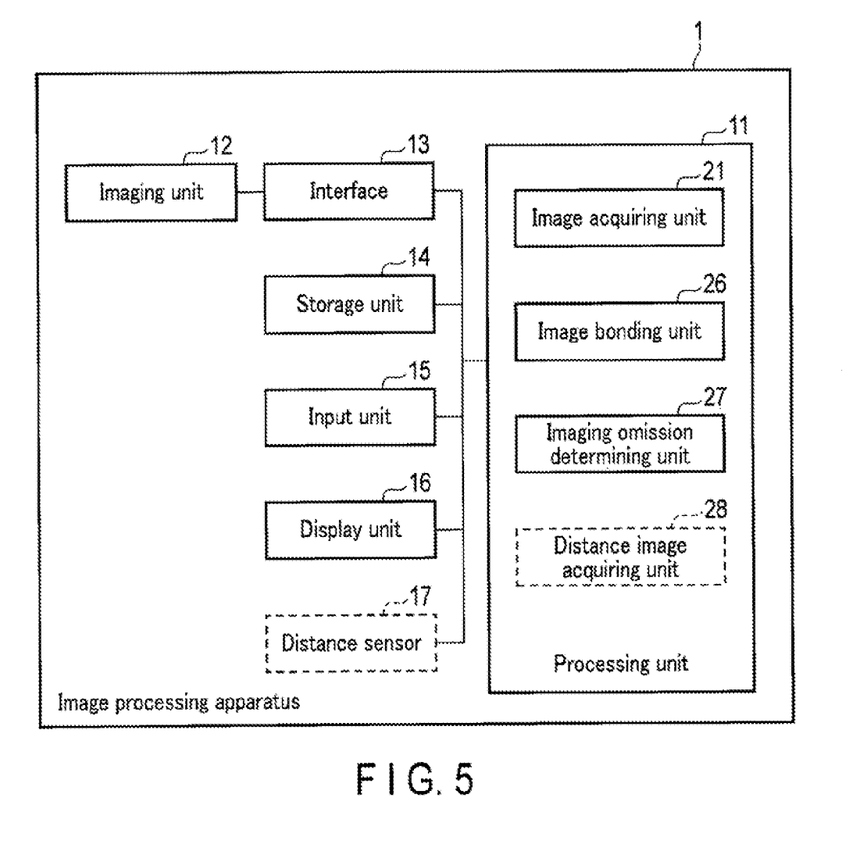
FIG. 5 is a block diagram illustrating a configuration example of an image processing apparatus according to the second embodiment.

FIG. 5 is a block diagram for explaining the configuration example of the image processing apparatus 1.

As illustrated in FIG. 5, the processing unit 11 achieves an image acquiring unit 21, an image bonding unit 26, and an imaging omission determining unit 27.

The image acquiring unit 21 is the same as the image acquiring unit 21 of the first embodiment, and explanation thereof will be omitted.

The image bonding unit 26 (combining unit) combines a plurality of photographed images acquired by the image acquiring unit 21, to generate a composite image. The image bonding unit 26 may extract, for example, a feature point from a plurality of images, to connect the images based on the extracted feature point. The method for connecting a plurality of photographed images by the image bonding unit 26 is not limited to any specific method.

The imaging omission determining unit 27 (identifying unit) identifies a region (imaging omission region) in which imaging of the imaging object was omitted, based on the composite image generated by the image bonding unit 23. For example, the imaging omission determining unit 27 determines whether the imaging object (for example, the product shelf 2) to be included in the composite image was photographed without omission. When the imaging omission determining unit 27 determines that the imaging object was not photographed without omission, the imaging omission determining unit 27 identifies the imaging omission region.

For example, the imaging omission determining unit 27 determines whether the composite image is formed with a loop shape. Specifically, the imaging omission determining unit 27 determines whether the composite image includes a region (non-connected region) that is not connected. When the composite image is formed with a loop shape, the imaging omission determining unit 27 determines that the composite image has an imaging omission region, and identifies the non-connected region in the composite image as the imaging omission region.

Figure 6:
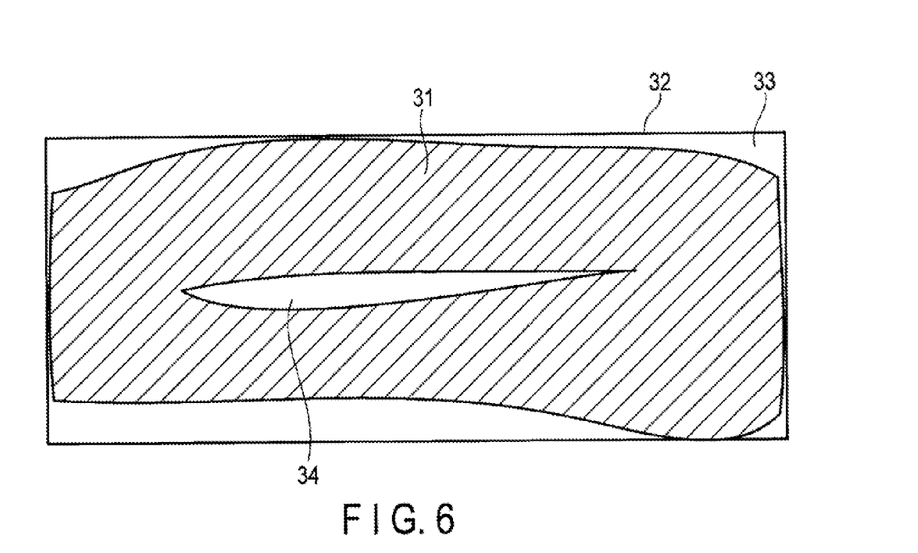
FIG. 6 is a diagram illustrating an example of a method for determining an imaging omission according to the second embodiment.

FIG. 6 is an example of a method for determining whether the composite image is formed with a look shape.

In the example illustrated in FIG. 6, the composite image 31 is formed with a loop shape. The example includes a non-connected region 34 surrounded by the composite image 31.

For example, the imaging omission determining unit 27 sets a minimum rectangle 32 that circumscribes the composite image 31. The imaging omission determining unit 27 determines whether any non-connected region exists other than a non-connected region 33 that contacts the minimum rectangle 32, for example, by labeling processing. When any non-connected region exists other than the non-connected region 33, the imaging omission determining unit 27 determines the non-connected region (for example, the non-connected region 34) other than the non-connected region 33 as the imaging omission region. When no non-connected region exists other than the non-connected region 33, the imaging omission determining unit 27 determines that no non-connected region exists.

The following is explanation of another example of a method for determining whether the composite image is formed with a loop shape.

Figure 7:
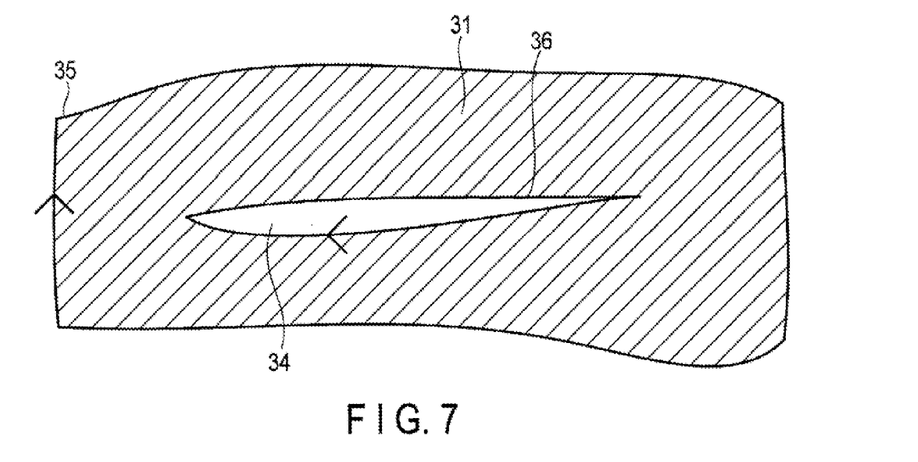
FIG. 7 is a diagram illustrating another example of the method for determining an imaging omission according to the second embodiment.

FIG. 7 illustrates another example of the method. In the example illustrated in FIG. 7, the composite image 31 is formed with a loop shape in the same manner as in FIG. 6. A non-connected region 34 exists inside the composite image 31.

For example, the imaging omission determining unit 27 extracts an edge loop of the composite image.

Specifically, the imaging omission determining unit 27 extracts an edge between the non-connected region and the composite image. When two or more edge loops are extracted, the imaging omission determining unit 27 determines that imaging omission exists. Specifically, the imaging omission determining unit 27 determines whether any edge loop exists other than the outer circumference of the composite image. In the example illustrated in FIG. 7, the imaging omission determining unit 27 extracts an edge loop 35 and an edge loop 36. Therefore, the imaging omission determining unit 27 determines that an imaging omission region (for example, non-connected region 34) exists.

Figure 8:
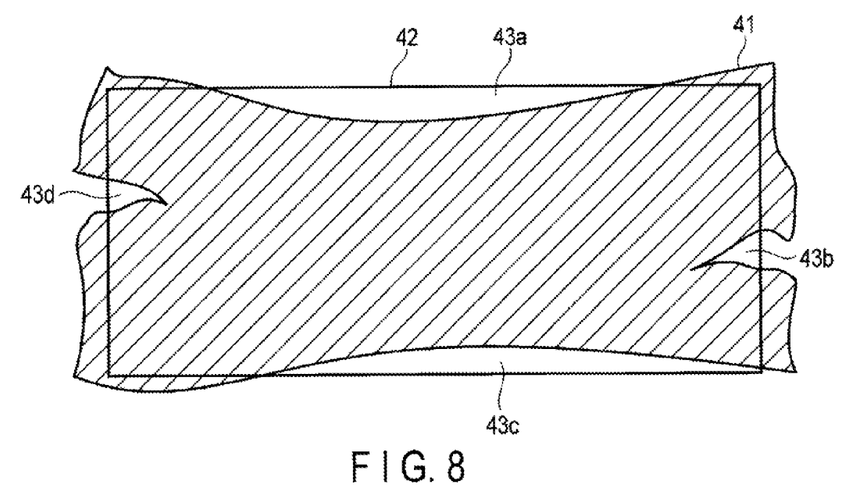
FIG. 8 is a diagram illustrating another example of the method for determining an imaging omission according to the second embodiment.

The imaging omission determining unit 27 also sets an imaging object region in which an imaging object appears in the composite image, and determines whether any non-connected region exists in the imaging object region. Specifically, when a non-connected region exists in the imaging object region, the imaging omission determining unit 27 determines that an imaging omission region exists, and identifies the non-connected region as the imaging omission region.

FIG. 8 illustrates an example of a method for determining whether any non-connected region exists in the imaging object region.

The imaging omission determining unit 27 sets an imaging object region 42 in the composite image 41. The imaging omission determining unit 27 determines whether any non-connected region exists in the imaging object region 42. In the example illustrated in FIG. 8, the imaging omission determining unit 27 finds non-connected regions 43*a* to 43*d*. Therefore, the imaging omission determining unit 27 determines imaging omission exists, and identifies the non-connected regions 43*a* to 43*d* as imaging omission regions.

The following is explanation of a method for setting an imaging object region.

Figure 9:
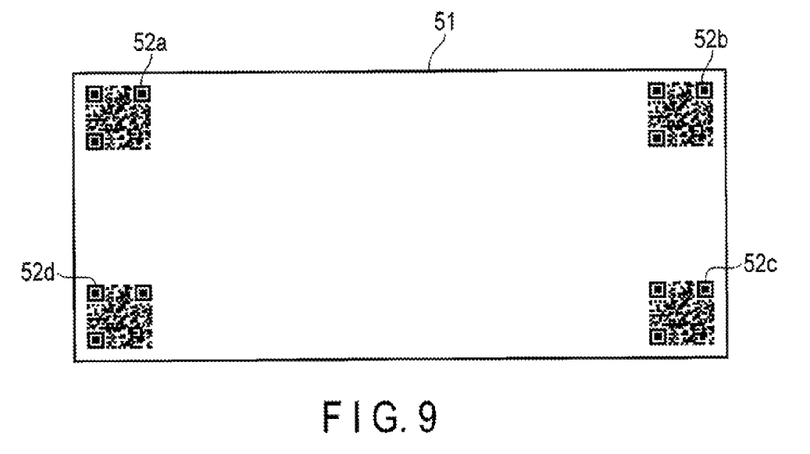
FIG. 9 is a diagram illustrating an example of a method for setting an imaging object region according to the second embodiment.

FIG. 9 illustrates an example of an imaging object to illustrate an example of the method for setting the imaging object region.

In the example illustrated in FIG. 9, an imaging object 51 (for example, product shelf 2) has a rectangular shape, and includes display regions 52a to 52d in four corners. The display regions 52a to 52d display respective codes that illustrate that the object is the imaging object. Specifically, the imaging object 51 includes a display region 52a in the upper left corner, the display region 52b in the upper right corner, the display region 52c in the lower right corner, and the display region 52d in the lower left corner.

An identification code displayed in each display region 52 identifies the imaging object 51. For example, the identification code indicates the position of the imaging object 51. For example, the identification code indicates in which position in the imaging object 51 the identification code exists. For example, the identification code displayed in the display region 52a in the upper left corner indicates that the identification code is positioned in the upper left corner of the imaging object 51. The identification codes displayed in the respective display regions 52 may indicate that the imaging object 51 has a rectangular shape. The identification codes may be one-dimensional codes, two-dimensional codes, symbols, or marks, and are not limited to specific structures.

The imaging omission determining unit 27 extracts the identification codes from the composite image. The imaging omission determining unit 27 identifies the imaging object 51 in accordance with the extracted identification codes, to set the imaging object region in which the imaging object 51 appears. For example, the imaging omission determining unit 27 extracts the identification codes displayed in the respective display regions 52. The imaging omission determining unit 27 acquires positional relations between the imaging object 51 and the respective identification codes, based on the respective identification codes. The imaging omission determining unit 27 sets a rectangle that circumscribes the display regions 52 of the respective identification codes based on the positional relations indicated by the respective identification codes, and sets the rectangle as the imaging object region.

The following is explanation of another method for setting an imaging object region.

The imaging omission determining unit 27 sets the imaging object region based on distances between the imaging unit 12 and respective portions of the photographed image.

The image processing apparatus 1 further includes a distance sensor 17.

The distance sensor 17 measures distances between the imaging unit 12 and respective portions of the photographed image. For example, the distance sensor 17 may measure a distance by applying a laser beam. The distance sensor 17 may be a stereo camera to measure a distance from a difference in image. When the distance sensor 17 is configured as a stereo camera, the distance sensor 17 may be integrated with the imaging unit 12.

The processing unit 11 also achieves a distance image acquiring unit 28.

The distance image acquiring unit 28 generates a distance image corresponding to the composite image, based on the distances measured by the distance sensor 17. Specifically, the distance image acquiring unit 28 generates a distance image that indicates distances between the imaging unit 12 and the respective portions of the composite image. The distance image acquiring unit 28 may acquire a distance image from an external device through the communication interface or the like.

Figure 10:
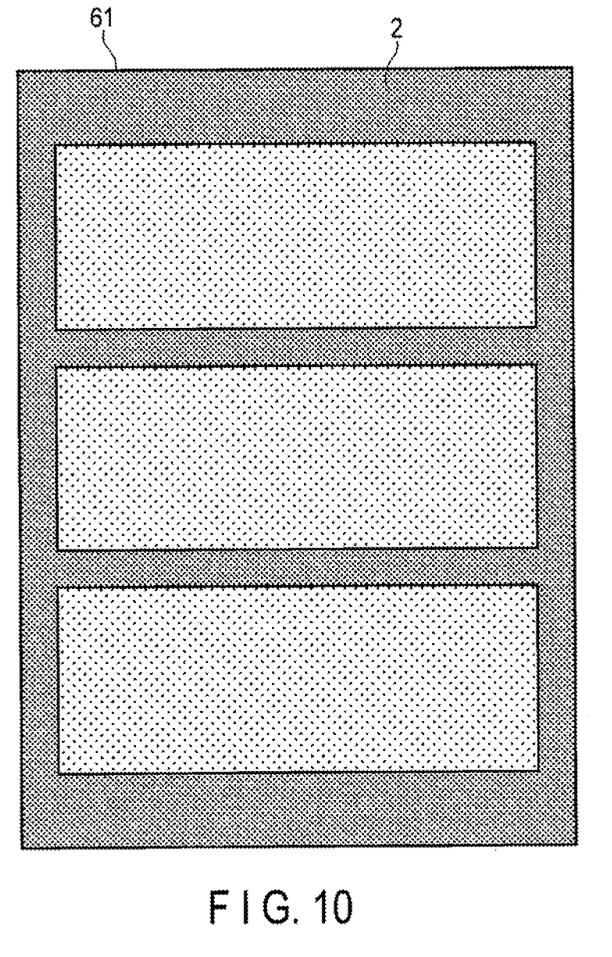
FIG. 10 is a diagram illustrating another example of the method for setting an imaging object region according to the second embodiment.

FIG. 10 illustrates an example of the distance image. In the example illustrated in FIG. 10, the distance image illustrates that a portion with a darker color has a smaller distance from the imaging unit 12, and a portion with a lighter color has a larger distance from the imaging unit 12.

In the example illustrated in FIG. 10, the distance image is an image obtained by photographing the product shelf 2.

The imaging omission determining unit 27 sets the imaging object region based on the distance image. For example, the imaging omission determining unit 27 sets a region that is closer than a predetermined distance as the imaging object region. In the example illustrated in FIG. 10, because the region where the product shelf exists is closer to the imaging unit 12 than the other regions are, the imaging omission determining unit 27 is enabled to set the region in which the product shelf 2 appears as the imaging object region. The imaging omission determining unit 27 may set a region that has a smaller distance than a predetermined threshold as the imaging object region, or set a region that has a smaller distance than the distances that the other regions have as the imaging object region.

Figure 11:
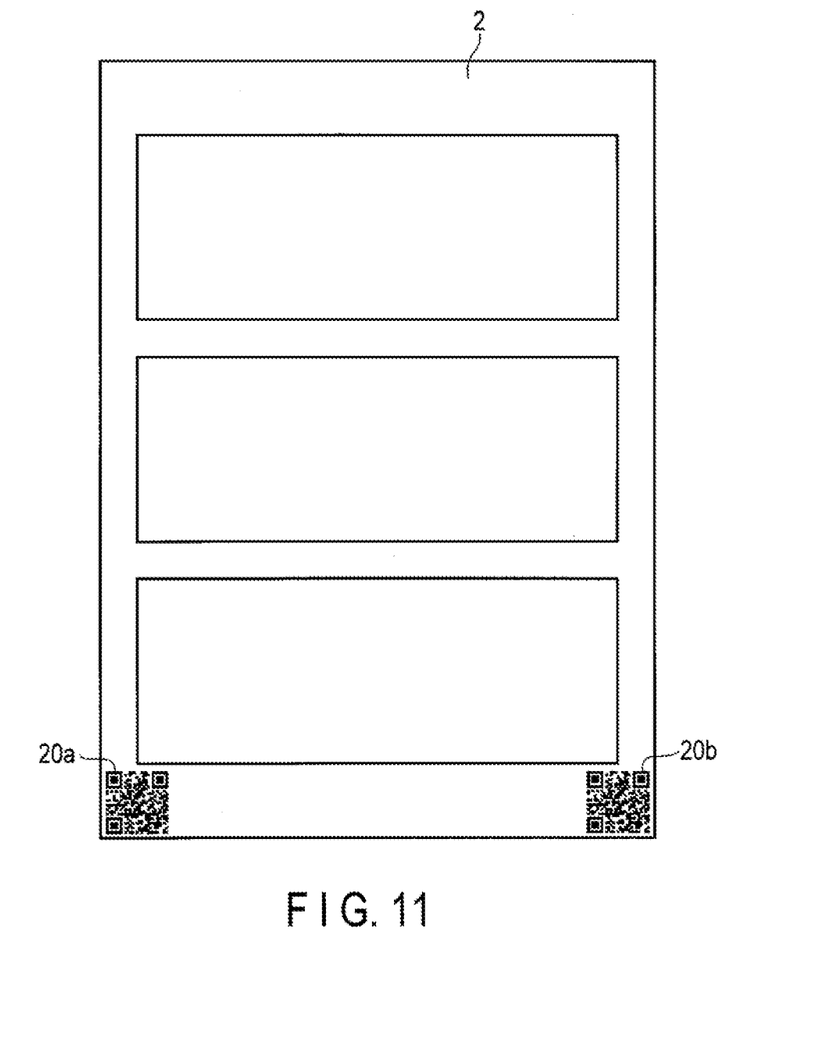
FIG. 11 is a diagram illustrating another example of the method for setting an imaging object region according to the second embodiment.

The imaging omission determining unit 27 may also set the imaging object region based on the distance image and the identification codes.

FIG. 11 illustrates an example of the product shelf 2.

The product shelf 2 illustrated in FIG. 11 includes display regions 20a and 20b and the like in which identification codes are displayed. For example, the product shelf 2 includes a display region 20a in the lower left corner, and a display region 20b in the lower right corner.

Because the lower portion of the product shelf 2 is formed to connect with the floor, the lower portion of the product shelf 2 is not easily distinguished from the floor in the distance image. Therefore, the imaging omission determining unit 27 identifies the imaging object region, using identification codes for the lower portion of the product shelf 2.

For example, the imaging omission determining unit 27 extracts the identification codes in the lower portion of the product shelf 2 from the composite image. The imaging omission determining unit 27 identifies the lower portion of the imaging object region in which the product shelf 2 appears, based on the identification codes. The imaging omission determining unit 27 also identifies an upper portion of the imaging object region, based on a distance image (for example, the distance image illustrated in FIG. 10). The imaging omission determining unit 27 identifies the imaging object region based on the lower portion of the imaging object region identified from the identification codes and the upper portion of the imaging object region identified from the distance image.

The imaging omission determining unit 27 may identify the imaging object region based on color information of the imaging object. For example, if the color of the imaging object is a color that does not exist in the background, the imaging omission determining unit 27 identifies the region where the color of the imaging object exists as the imaging object region.

The imaging omission determining unit 27 may set the imaging object region based on the position and the orientation of the imaging unit 12. For example, the imaging omission determining unit 27 spatially grasps which region the imaging unit 12 is photographing, using a positioning sensor to identify the position of the imaging unit 12 and a gyro sensor to measure the orientation of the imaging unit 12. The imaging omission determining unit 27 may set the imaging object region in the composite image, based on 3D data indicating the position and the size of the imaging object and the spatial position and orientation of the imaging unit 12.

The method for determining presence/absence of imaging omission and the method for identifying the imaging omission region by the imaging omission determining unit 27 are not limited to any specific methods.

The following is explanation of an operation example of the image processing apparatus 1.

Figure 12:
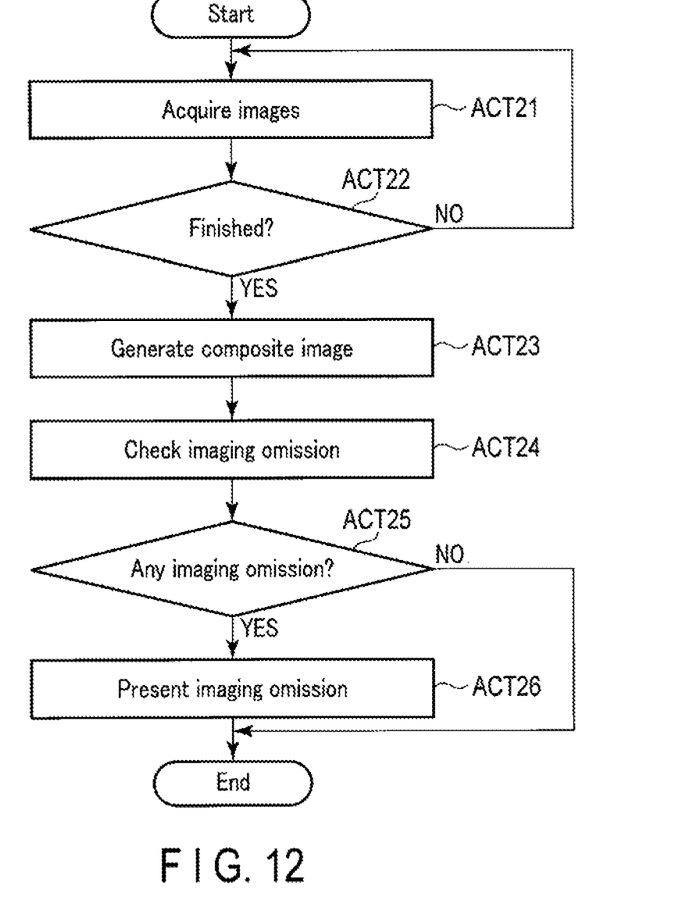
FIG. 12 is a flowchart illustrating an operation example of the image processing apparatus according to the second embodiment.

FIG. 12 is a flowchart for explaining the operation example of the image processing apparatus 1.

First, the processing unit 11 of the image processing apparatus 1 acquires photographed images (ACT 21). When the processing unit 11 acquires photographed images, the processing unit 11 determines whether acquisition of photographed images is finished (ACT 22). For example, the processing unit 11 determines whether the processing unit 11 received an operation input to finish acquisition of photographed images through the input unit 15.

When the processing unit 11 determines that acquisition of photographed images are not finished (ACT 22, NO), the processing unit 11 returns to ACT 21.

When the processing unit 11 determines that acquisition of photographed images are finished (ACT 22, NO), the processing unit 11 generates a composite image from the acquired photographed images (ACT 23). When the processing unit 11 generates a composite image, the processing unit 11 determines whether the composite image includes any imaging omission (ACT 24).

When the processing unit 11 determines that the composite image includes any imaging omission (ACT 25, YES), the processing unit 11 presents the imaging omission region on the display unit 16 or the like (ACT 26).

When the processing unit 11 determines that the composite image includes no imaging omission (ACT 25, NO) or the processing unit 11 presents the imaging omission region (ACT 26), the processing unit 11 ends the operation.

The processing unit 11 may generate a composite image whenever the processing unit 11 acquires a photographed image. For example, the processing unit 11 may additionally connect a photographed image to the existing composite image, whenever the processing unit 11 acquires a photographed image.

The processing unit 11 may also present absence of imaging omission, when the processing unit determines that no imaging omission exists.

Figure 13:
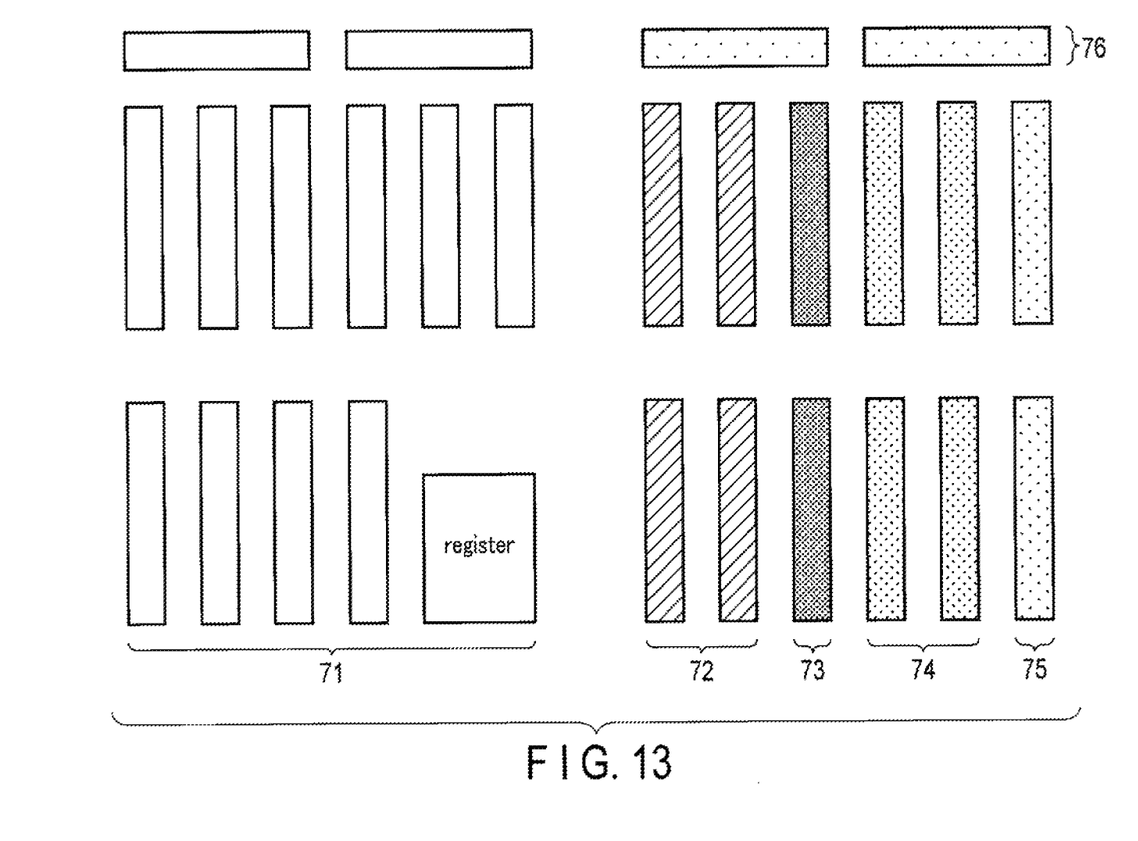
FIG. 13 is a diagram illustrating a layout example of the image processing apparatus according to the second embodiment.

The processing unit 11 may also indicate that the imaging was finished or any imaging omission exists, for a plurality of imaging objects.

FIG. 13 is an example of a layout drawing visualizing the state of each of imaging objects as to whether the imaging was finished or any imaging omission exists.

The processing unit 11 displays the layout drawing on the display unit 16 or the like.

The layout drawing illustrates a plurality of imaging objects. In the example illustrated in FIG. 13, the layout drawing illustrates the state of each of a plurality of product shelves (imaging objects), with colors or thicknesses, as to whether the imaging was finished or any imaging omission exists.

In the layout drawing, for example, the product shelves 71 are product shelves that do not require imaging. The product shelves 72 are product shelves that were imaged and include no imaging omissions. The product shelves 73 are product shelves, about ⅔ of which were imaged. The product shelves 74 are product shelves, about ⅓ of which were imaged. The product shelves 75 are product shelves that are to be imaged. The product shelves 76 are product shelves that were imaged but include imaging omissions. The layout drawing illustrated in FIG. 13 illustrates the imaging state of each of the product shelves by the thickness of the color.

The image processing apparatus with the above structure generates a composite image from a plurality of photographed images, to determine whether any imaging omission exists based on the composite image. The image processing apparatus also identifies an imaging omission region. Consequently, the image processing apparatus enables easy check of the image acquisition state, and presents a region in which an image was not acquired.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

unit 22 reduces a photographed image. For example, the image bonding unit 23 may extract a feature point from a plurality of photographed images, to connect the images based on the extracted feature point. The method for connecting a plurality of photographed images by the image bonding unit 23 is not limited to any specific method.

The display processor 24 displays a preview image obtained by connecting the images by the image bonding unit 23 on the display unit 16. For example, the display processor 24 sets a preview display region in the display unit 16. The display processor 24 displays a preview image in the set preview display region. The display processor 24 updates the preview image, whenever the image bonding unit 23 adds a photographed image to the preview image.

The display processor 24 may fix the size of the preview display region. For example, the display processor 24 may display the preview image to fit into the size of the preview display region. The display processor 24 may dynamically change the size of the preview display region. For example, the display processor 24 may change the size.

What is claimed is:

1. An image processing apparatus comprising:
an image acquiring unit that acquires a plurality of photographed images, with imaged areas thereof being gradually changed;
a combining unit that combines the plurality of photographed images acquired by the image acquiring unit to generate a composite image; and
an identifying unit that:
sets an imaging object region in which an imaging object appears in the composite image,
determines whether a non-connected region exists in the imaging object region, and
when the non-connected region is determined to exist in the imaging object region, identifies the non-connected region in the imaging object region as an imaging omission region, wherein
the identifying unit sets the imaging object region based on an identification code displayed on the imaging object.

2. An image processing apparatus comprising:
- an image acquiring unit that acquires a plurality of photographed images, with imaged areas thereof being gradually changed;
- a combining unit that combines the plurality of photographed images acquired by the image acquiring unit to generate a composite image;
- an identifying unit that:
  - sets an imaging object region in which an imaging object appears in the composite image,
  - determines whether a non-connected region exists in the imaging object region, and
  - when the non-connected region is determined to exist in the imaging object region, identifies the non-connected region in the imaging object region as an imaging omission region; and
- a distance image acquiring unit that acquires a distance image corresponding to the composite image,
- wherein the identifying unit sets the imaging object region based on the distance image acquired by the distance image acquiring unit.

3. The image processing apparatus according to claim 2, wherein
the identifying unit sets a region that has a smaller distance than a distance that another region has as the imaging object region, based on the distance image.

4. The image processing apparatus according to claim 2, further comprising:
- a distance sensor that measures distances of respective portions of each of the photographed images,
- wherein the distance image acquiring unit generates the distance image based on the distances of the respective portions measured by the distance sensor.

* * * * *